(12) United States Patent
Sumi et al.

(10) Patent No.: US 11,792,562 B2
(45) Date of Patent: Oct. 17, 2023

(54) HEADPHONES

(71) Applicant: OMRON CORPORATION, Kyoto (JP)

(72) Inventors: Masaaki Sumi, Kyoto (JP); Hiroyuki Onitsuka, Kyoto (JP); Junya Fujita, Kyoto (JP); Takehiro Agata, Kyoto (JP); Kazuma Matsui, Kyoto (JP); Mitsunori Sugiura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/579,662

(22) Filed: Jan. 20, 2022

(65) Prior Publication Data

US 2022/0272434 A1 Aug. 25, 2022

(30) Foreign Application Priority Data

Feb. 24, 2021 (JP) .................................. 2021-27732

(51) Int. Cl.
*H04R 1/10* (2006.01)
*F25B 21/02* (2006.01)

(52) U.S. Cl.
CPC ........... *H04R 1/1091* (2013.01); *F25B 21/02* (2013.01); *H04R 1/1008* (2013.01); *H04R 1/1041* (2013.01); *H04R 1/1058* (2013.01); *F25B 2321/023* (2013.01); *F25B 2321/0251* (2013.01)

(58) Field of Classification Search
CPC .. H04R 1/1091; H04R 1/1008; H04R 1/1041; H04R 1/1058; F25B 21/02; F25B 2321/023; F25B 2321/0251; A63F 13/28; A63F 13/54
See application file for complete search history.

(56) References Cited

U.S. PATENT DOCUMENTS

| | | | | |
|---|---|---|---|---|
| 5,756,969 | A * | 5/1998 | Machino | G03G 15/2039 219/501 |
| 2008/0264464 | A1* | 10/2008 | Lee | H10N 10/17 136/203 |
| 2013/0243235 | A1* | 9/2013 | Clayton | H04R 1/105 381/371 |
| 2015/0253855 | A1* | 9/2015 | Grant | A63F 13/214 345/173 |
| 2017/0099539 | A1* | 4/2017 | Di Censo | G05D 23/00 |
| 2018/0262827 | A1* | 9/2018 | Vaughan | H04R 1/1041 |
| 2021/0306737 | A1* | 9/2021 | Dory | H04R 1/1075 |
| 2023/0000685 | A1* | 1/2023 | Nilsson | H04R 1/10 |

FOREIGN PATENT DOCUMENTS

| | | | |
|---|---|---|---|
| JP | 2003-18687 A | 1/2003 | |
| JP | 2003018687 A | * 1/2003 | ............... H04R 1/10 |

* cited by examiner

*Primary Examiner* — Oyesola C Ojo
(74) *Attorney, Agent, or Firm* — METROLEX IP LAW GROUP, PLLC

(57) ABSTRACT

A set of headphones (1) comprises a pair of speaker units (3); a pair of ear pad portions (4); a plurality of temperature change modules (24) that are provided inside the pair of ear pad portions (4), and that heat and/or cool electrically so as to convey a temperature other than normal temperature to the user; and a temperature control unit (31) that drives the plurality of temperature change modules (24) on a rotating basis while shifting the phase of operation individually or in groups.

7 Claims, 10 Drawing Sheets

HEADPHONES

CROSS-REFERENCE TO RELATED APPLICATIONS

This application claims priority to Japanese Patent Application No. 2021-027732 filed on Feb. 24, 2021. The entire disclosure of Japanese Patent Application No. 2021-027732 is hereby incorporated herein by reference.

BACKGROUND

Technical Field

The present invention relates to headphones comprising a pair of ear pad portions that cover at least part of the user's ears.

Description of the Related Art

A heating and cooling device for a headphone, which is mounted on headphones and allows a sense of coolness to be easily obtained, while still having an appearance that is suitable for wearing in everyday life, is known as a prior art (Patent Literature 1). With this device, a heating and cooling means provided to the ear pads heats and cools the ear of the user (wearer) in contact with the ear pads when the headphones are being worn. The temperature of the user's skin is sensed, and the amount of heating and cooling is controlled according to the sensed temperature. Alternatively, the start and stop of the heating operation or the cooling operation is controlled according to the sensed temperature. This allows the headphones to be worn comfortably for extended periods.

CITATION LIST

Patent Literature

Patent Literature 1: JP-A 2003-18687

SUMMARY

With the prior art discussed above, the heating and cooling means heats or cools the same portion of the user's ear through the ear pad. However, if the same area is constantly heated or cooled, the sensation is dulled over time. Therefore, during heating the user does not feel much warmth, and during cooling the user does not feel much coolness. There is also a risk of low-temperature burns during heating.

It is an object of one aspect of the present invention to realize headphones with which temperature changes can be continuously and effectively perceived.

In order to solve the above problem, the headphones according to one aspect of the present invention employ the following configuration.

The headphones according to one aspect of the present invention comprise a pair of speaker units, a pair of ear pad portions that cover at least part of the user's ears, a plurality of temperature change units that are provided inside the pair of ear pad portions and that heat and/or cool electrically so as to convey a temperature other than normal temperature to the user, and a temperature control unit that drives the plurality of temperature change units on a rotating basis while shifting the phase of operation individually or in groups.

With the above configuration, since the temperature control unit drives the temperature change units individually or in groups while shifting the phase of operation on a rotating basis, it is less likely that the sensation will be dulled, and temperature changes can be perceived effectively and continuously.

In the headphones according to the above-mentioned aspect, the temperature change units may be configured to comprise a Peltier element. This allows the temperature change units to be realized more easily by using a Peltier element.

The headphones according to the above-mentioned aspect may be configured to comprise heat sinks that are disposed inside the ear pad portions and on the back surface side of the Peltier elements, wherein the heat sinks have a plurality of blocks that protrude toward the side that comes into contact with the user, and the back surfaces of the Peltier elements are in contact with the top surfaces of the blocks. This makes it possible for a cushioning material to be disposed at a portion other than the blocks, which improves the cushioning when the headphones are worn.

The headphones according to the above-mentioned aspect may be configured to comprise a protective sheet having a cushioning function, on the surface of the temperature change units on the side that makes contact with the user. This allows the protective sheet to function as a cushioning material between the ear and the headphones, and softens the feel when contact is made.

In the headphones according to the above-mentioned aspect, the configuration may be such that an opening is provided in the surface of each of the pair of ear pad portions on the side that comes into contact with the user, and the surface of the temperature change unit provided with the protective sheet is exposed to the outside through this opening.

With this configuration, the temperature change units can be brought into contact with the user's ears through the protective sheet. Consequently, the temperature of the temperature change units can be transmitted to the user more effectively than when the ear pad portions come into contact with the ears through cloth or another such a covering layer.

In the headphones according to the above-mentioned aspect, the temperature control unit may be configured to the plurality of the temperature change units on a rotating basis while shifting the phase of operation individually or in groups, so as to match the content of a game. As a result, the world view of the game can include temperature, giving a more immersive feel to the game.

In order to solve the above problem, the temperature-variable device for a headphone that is mounted on the headphones according to one aspect of the present invention comprises a plurality of temperature change units that are provided inside a pair of ear pad portions that cover at least a part of the user's ear, and that heat and/or cool electrically so as to convey a temperature other than normal temperature to the user; and a temperature control unit that drives the plurality of temperature change units on a rotating basis while shifting the phase of operation individually or in groups. This allows the headphones according to one aspect of the present invention to be configured by mounting on the ear pad portions of the headphones.

EFFECT

One mode of the present invention realizes headphones with which temperature changes can be continuously and effectively perceived.

DETAILED DESCRIPTION

An embodiment relating to one aspect of the present disclosure (hereinafter also referred to as "this embodiment") will be described with reference to the drawings. In this embodiment, as one aspect of the headphones disclosed herein, headphones 1 in which a Peltier element is used as a temperature change module is given as an example.

§ 1 Application Example

Figure 1:
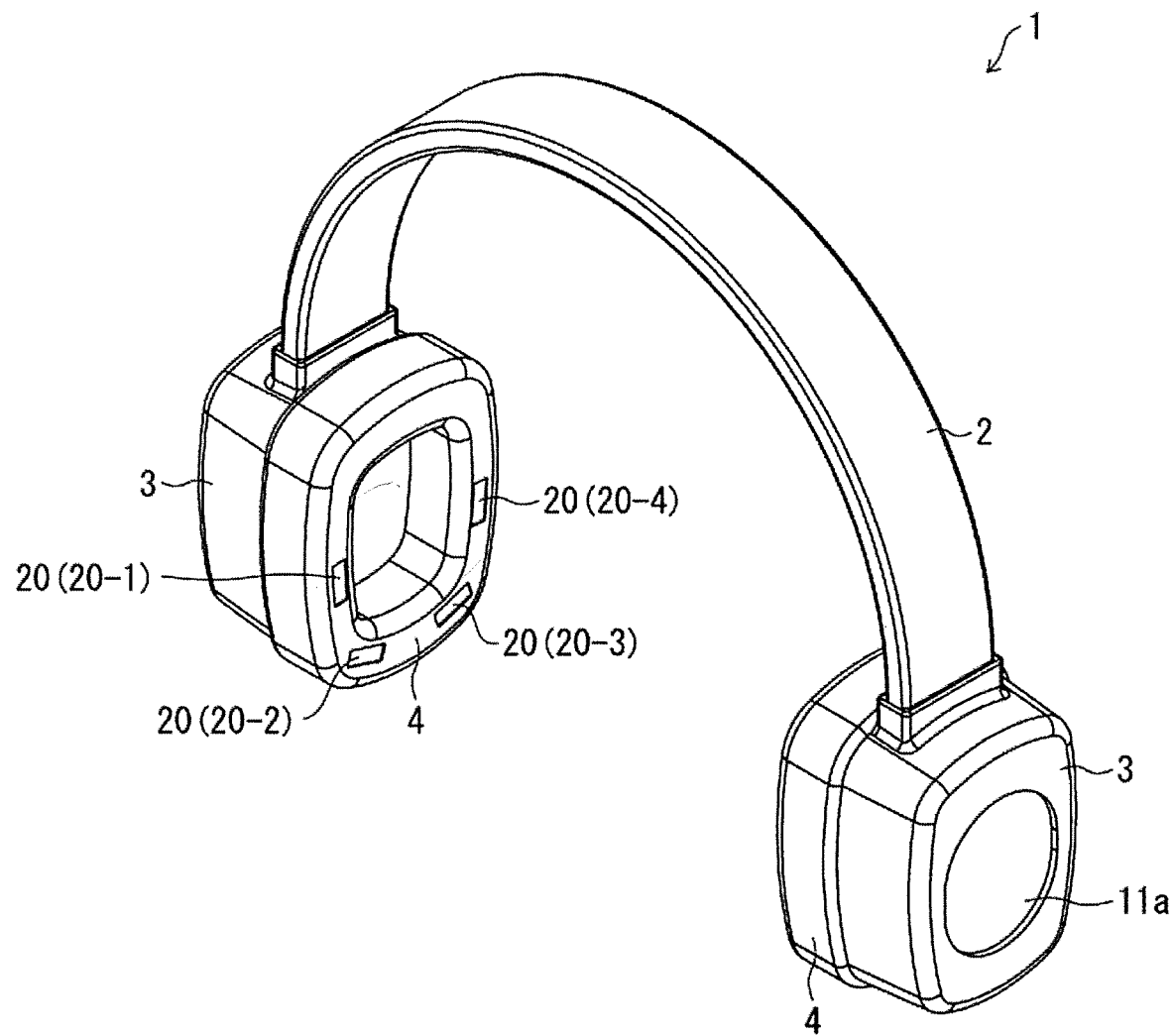
FIG. 1 is an oblique view of the headphones according to an embodiment.
Figure 5:
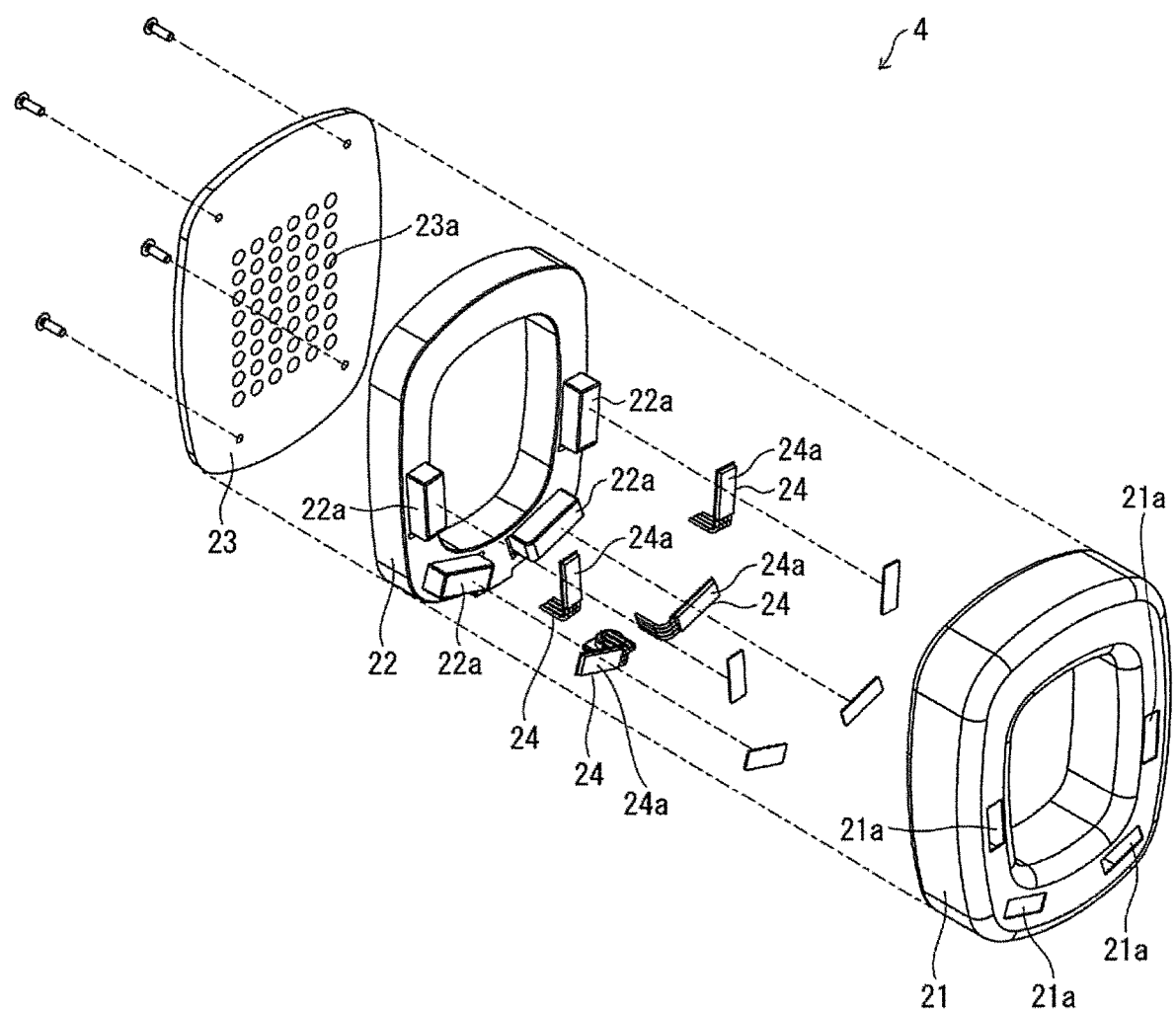
FIG. 5 is an exploded oblique view of the ear pad portion.

First, an example of a situation in which the headphones 1 are used will be described with reference to FIGS. 1, 5, 7, and 8 to 10. As shown in FIGS. 1 and 5, the headphones 1 comprise a plurality of heat conductive portions 20 in the ear pad portions 4 that come into contact with the user's ears. The heat conductive portions 20 are configured such that protective sheets 25 are affixed to the surfaces of the temperature change modules (temperature change units) 24, and come into contact with the user's ears. The temperature change modules 24 are constituted by Peltier elements, for example.

Figure 8:
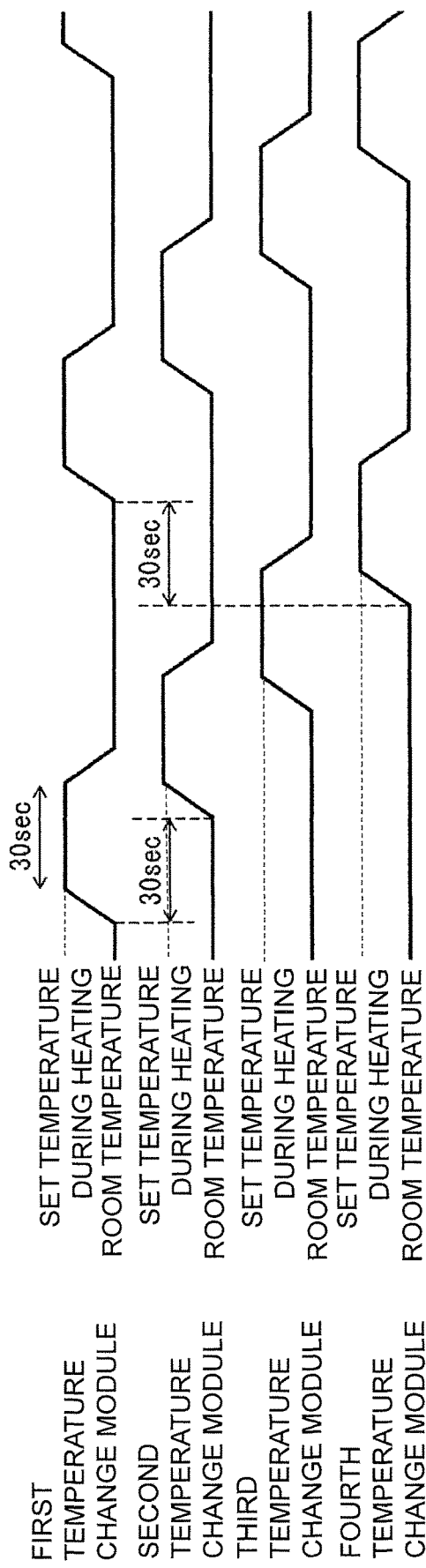
FIG. 8 is an operation diagram showing an example of the operation of the temperature change module performed by the control device included in the headphones during heating.
Figure 9:
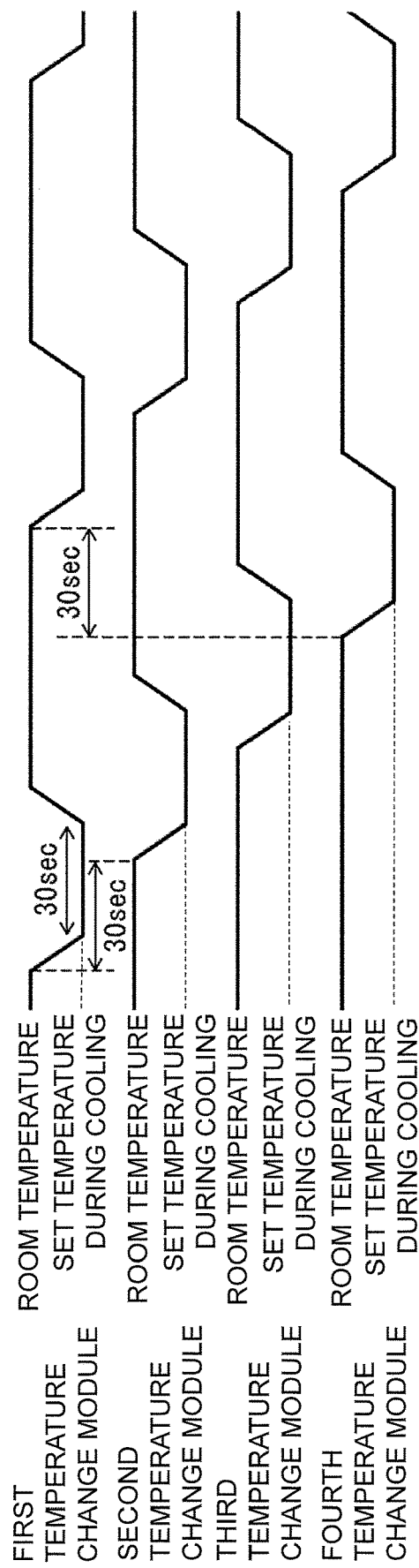
FIG. 9 is an operation diagram showing an example of the operation of the temperature change module performed by the control device during cooling.
Figure 10:
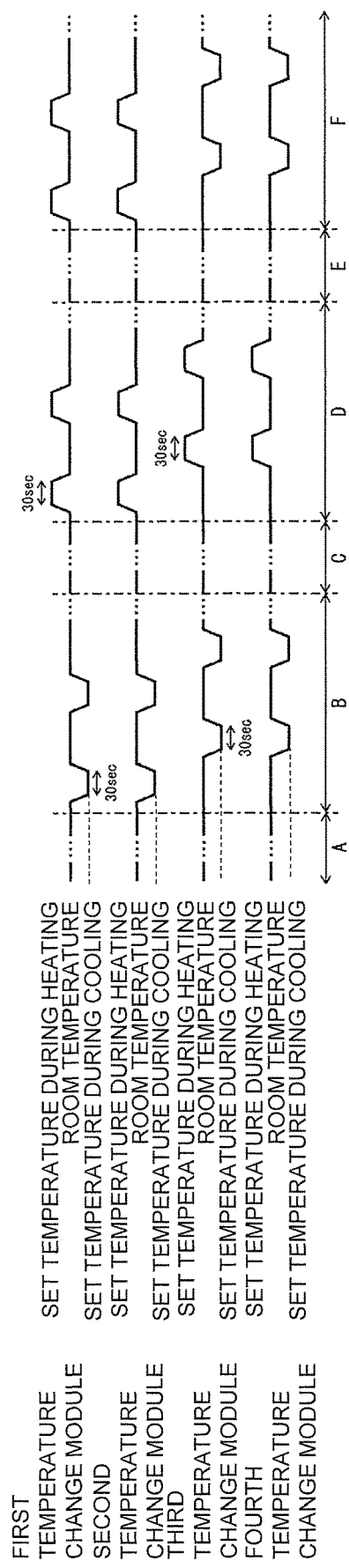
FIG. 10 is an operation diagram showing an example of the operation of the temperature change module performed by the control device during game linking.

A control device 30 is connected to a plurality of temperature change modules 24 and can individually drive the temperature change modules 24 individually. As shown in FIGS. 8 to 10, the temperature change modules 24 are driven on a rotating basis.

Consequently, it is less likely that the sensation will be dulled, so during heating the user will continue to feel the temperature change (warmth), and during cooling the user will continue to feel the temperature change (coolness). Also, even if the headphones 1 are continuously used for an extended period during heating, low-temperature burns can be prevented. Furthermore, during link-up with a game, the world view of the game can be depicted not only by the video, but also by temperature, such as a world of ice or a world of flame, and this makes gives the game a more immersive feel.

§ 2 Configuration Example

1. Overview of Configuration of Headphones 1

Figure 2:
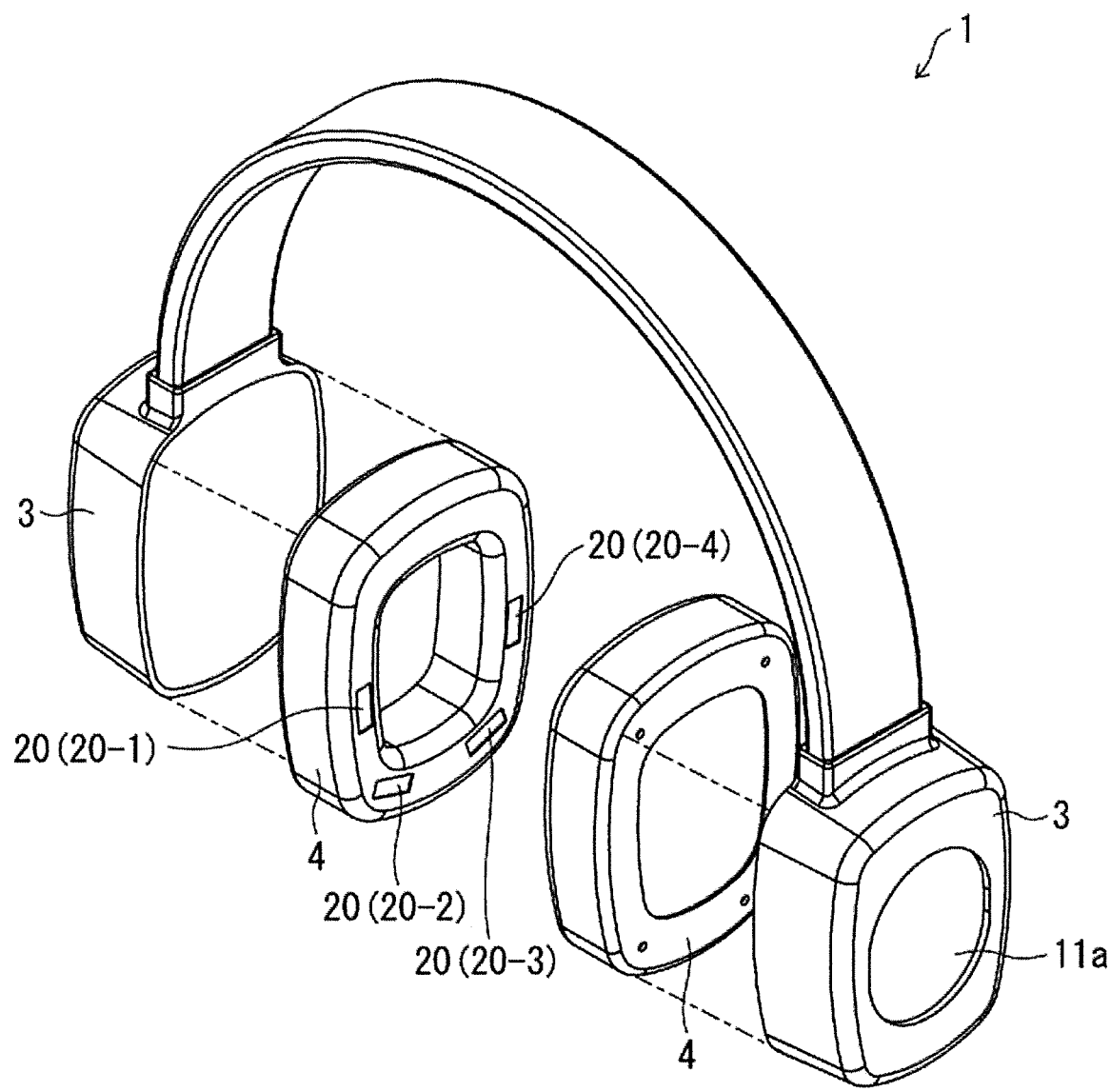
FIG. 2 is an exploded oblique view of the headphones.

FIG. 1 is an oblique view of the headphones 1 according to this embodiment. FIG. 2 is an exploded oblique view of the headphones 1. As shown in FIGS. 1 and 2, the headphones 1 have an arm 2, a pair of speaker units 3, and a pair of ear pad portions 4.

The arm 2 is, for example, a curved, slender member that rests on the user's head or neck. One speaker unit 3 and one ear pad portion 4 are provided at each of the two ends of the arm 2. The speaker units 3 output sound inward, which is the side in contact with the user's ear. The ear pad portions 4 are members that cover at least a part of the ears, and are attached to the inward-facing surfaces of the speaker units 3. In this embodiment, an example is given of a configuration in which the speaker units 3 are fixed to the ends of the arm 2, and the ear pad portions 4 are attached on the inside of the speaker units 3. However, this configuration is not the only option. Hereinafter, the side facing the user's ear or head (the side in contact with the user) when the headphones are worn state shall be referred to as the inside of the speaker units 3 and the ear pad portions 4, and the opposite side shall be referred to as the outside of the speaker units 3 and the ear pad portions 4.

2. Speaker Units 3

Figure 3:
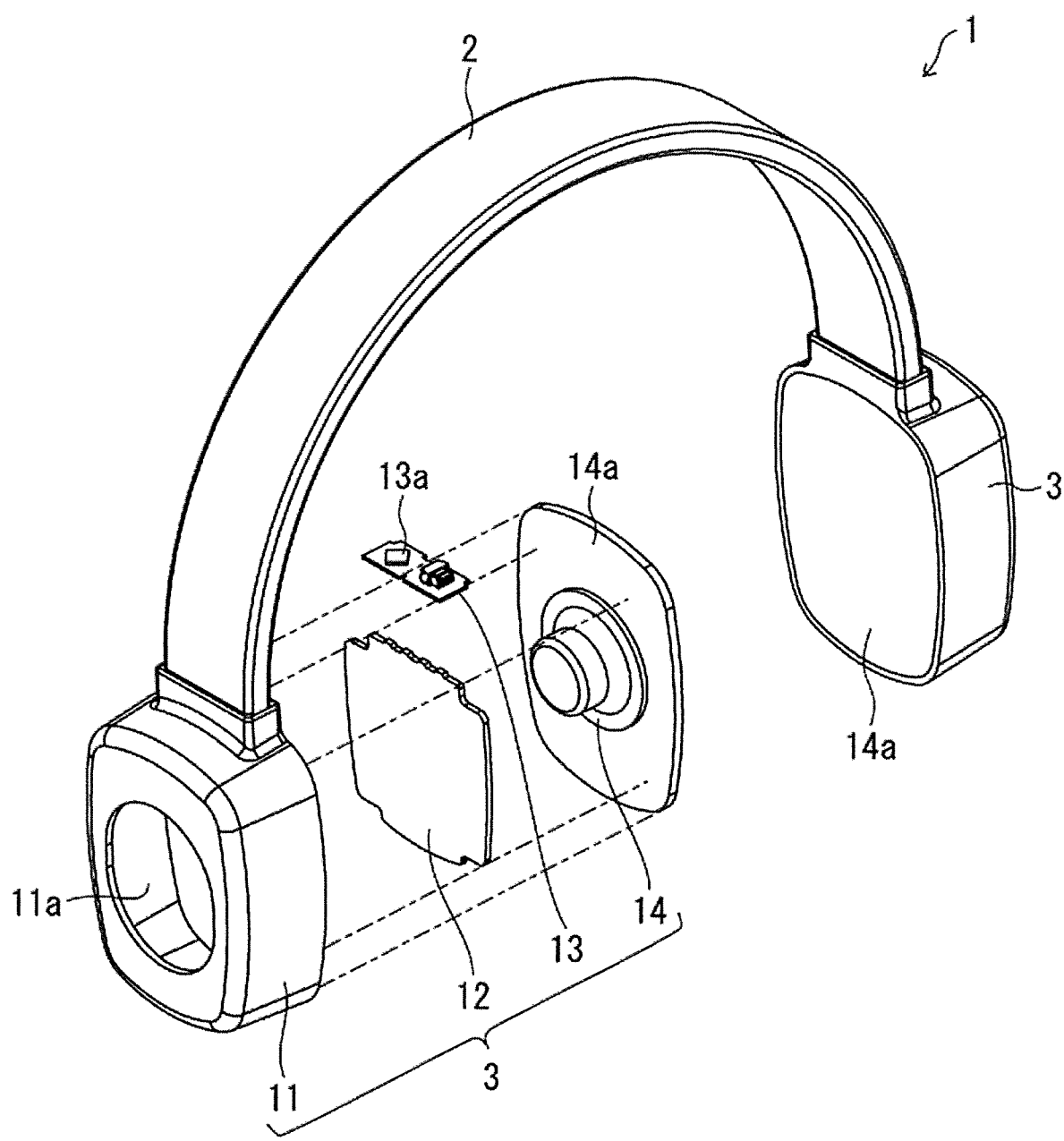
FIG. 3 is an exploded oblique view of a speaker unit in the headphones.

FIG. 3 is an exploded oblique view of one of the speaker units 3 in the headphones 1. As shown in FIG. 3, each speaker unit 3 comprises a case 11, a light guide plate 12, an LED substrate 13, a speaker 14, a control device 30 (discussed below), a harness connection unit 32 (see FIG. 7), and the like. The case 11 is a shallow cup-shaped member whose side surface is attached to the end of the arm 2, and whose inward-facing surface is open. Inside the case 11 are housed the light guide plate 12, the LED substrate 13, the speaker 14, the control device 30, and the harness connection unit 32 inside the case 11. In this embodiment, an example is given in which the shape of the case 11 is substantially rectangular, with rounded corners, but the shape is not limited to this, and may instead be elliptical, circular, or the like.

The light guide plate 12 is a transparent, thin plate member made of a translucent material such as acrylic resin or glass. The light guide plate 12 does not necessarily have to be colorless and transparent, and may be lightly colored so long as it is translucent or transparent. Grooves or the like are formed by shaping in a design such as text or graphics on the back surface or the front surface of the light guide plate 12. On the LED substrate 13 are mounted an LED (light emitting diode; not shown) as a light source, and a drive circuit 13a for driving the LED. The LED is disposed so as to face the end surface of the light guide plate 12, and supplies light to the light guide plate 12. The drive circuit 13a drives the LED under the control of the control device 30.

The light that is emitted from the LED and is incident from the end surface to the inside of the light guide plate 12 propagates while total reflection is repeated, and a part of the light is reflected by the bumps, etc., formed by shaping on the surface to change the optical path, and exits from the front (exit surface) of the light guide plate 12. This emitted light causes the design formed by shaping to be displayed in light.

In the case 11, a window portion 11a consisting of a transparent portion or an opening is formed on a surface facing outward (a surface corresponding to the bottom of the cup). The front (exit surface) of the light guide plate 12 faces the window portion 11a side of the case 11, allowing the display of light produced by the light guide plate 12 to be seen through the window portion 11a.

The LED (light emitting diode) may be a full-color-compatible LED that allows the color to be changed. Also, the LED substrate 13 may comprise a plurality of light sources so that the light will be uniformly incident from the end surface of the light guide plate 12.

Also, the light guide plate 12 may have different designs formed thereon for light having different travel directions, and the LED substrate 13 may be installed on a plurality of end surfaces having different travel directions. Consequently, the light source that is to be lit can be switched so that different designs can be displayed by a single light guide plate (one planar light device). Also, the configuration may be such that a plurality of light guide plates 12 are pre-stacked, and LEDs are disposed on the various light guide plates so that different designs can be displayed.

The speaker 14 converts the audio signal outputted from the control device 30 into sound. The speaker 14 is disposed further to the inside than the light guide plate 12, and is supported by a base 14a. In a state in which the speaker 14 is housed in the case 11, the open surface of the case 11 is closed off by the base 14a. The ear pad portion 4 is attached to the side (inward-facing side) of the base 14a that closes off the open surface.

Although not depicted in the drawings, the harness connection unit 32 is provided at the lower end portion of the case 11 on the opposite side from the side connected to the arm 2. The speaker unit 3 (that is, the headphones 1) is connected to an external PC by wire via a harness connected to the harness connection unit 32.

3. Ear Pad Portions 4

Figure 4:
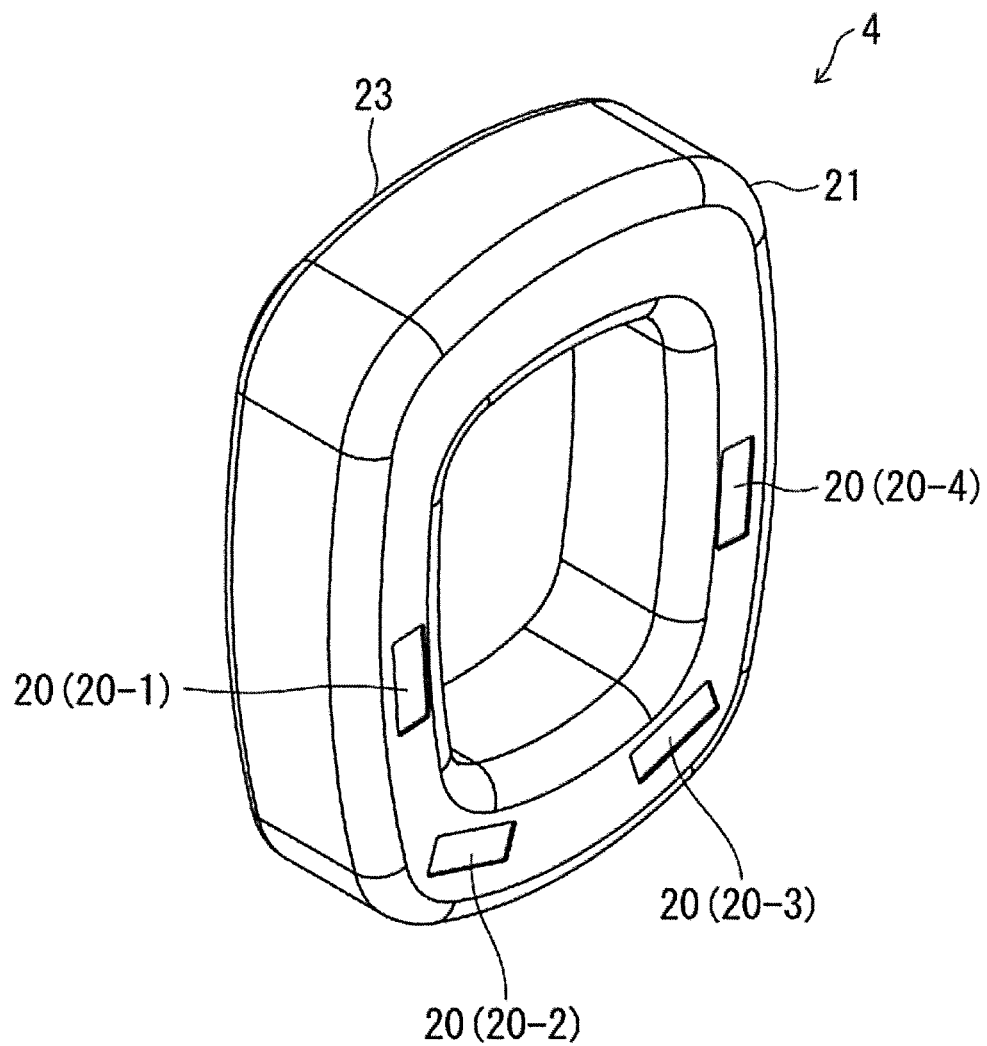
FIG. 4 is an oblique view of the ear pad portion in the headphones.
Figure 6A:
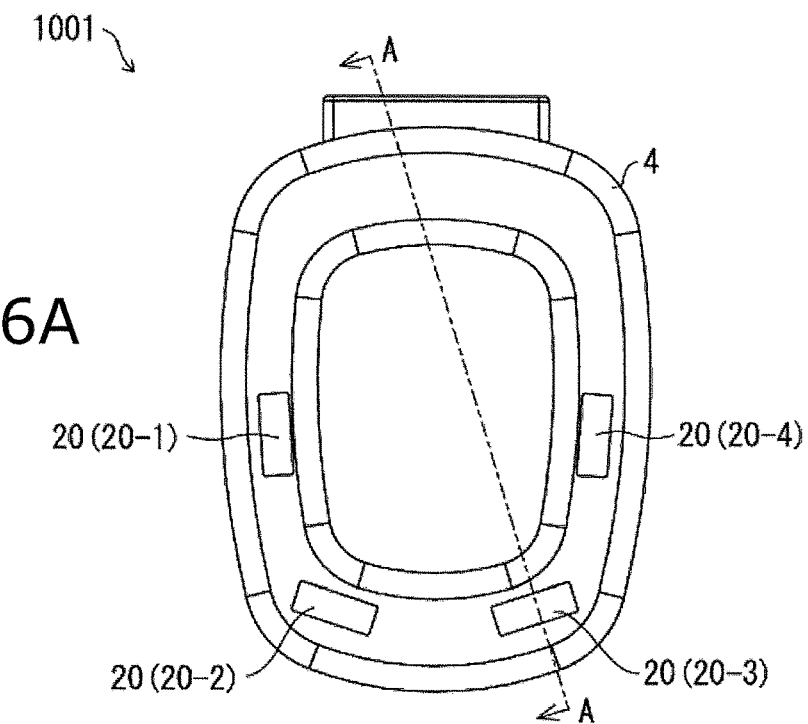
FIG. 6A is a plain view of the ear pad portion and the speaker unit.
Figure 6B:
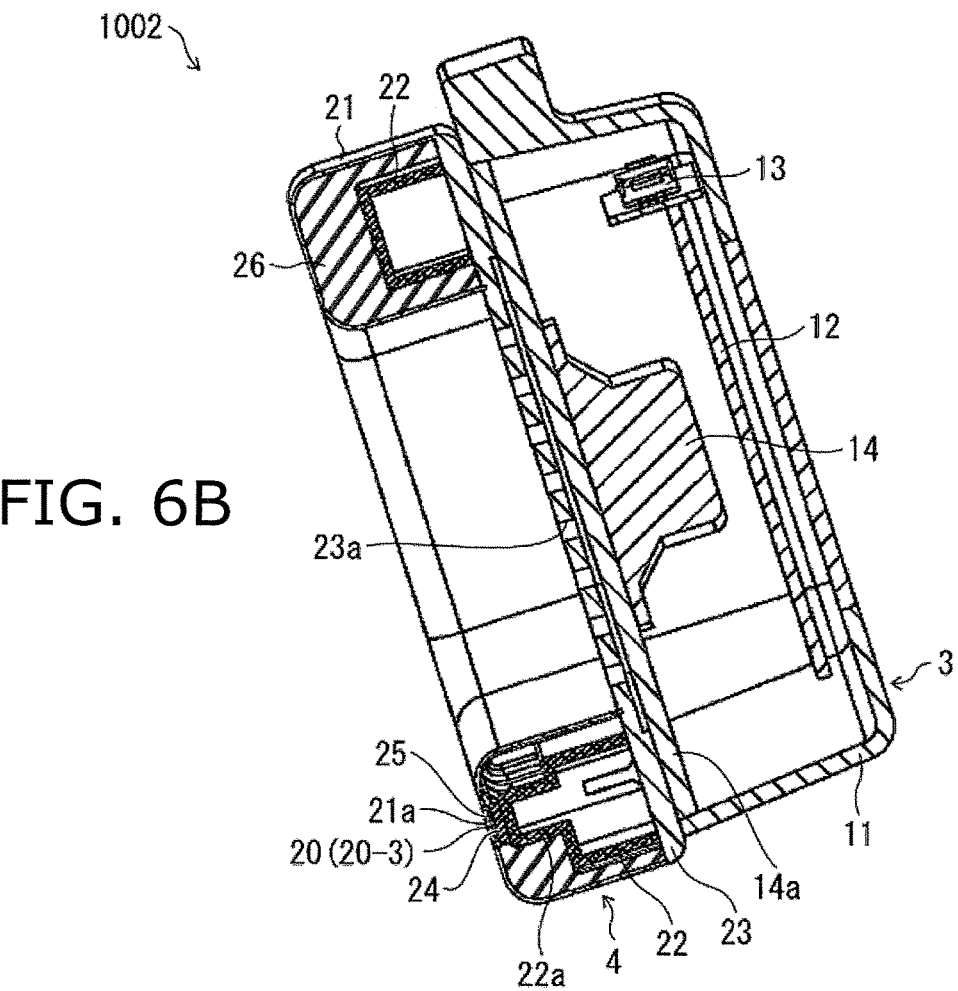
FIG. 6B is a cross-sectional view along A-A line in FIG. 6A.

FIG. 4 is an oblique view of the ear pad portion 4 in the headphones 1. FIG. 5 is an exploded oblique view of the ear pad portion 4. FIG. 6A is a plain view of the ear pad portion 4 and the speaker units 3, and FIG. 6B is a cross-sectional view taken along the A-A line in FIG. 6A.

As shown in FIG. 4, the ear pad portion 4 has an outer shape corresponding to the outer shape of the case 11 of the speaker unit 3 (a substantially rectangular shape with rounded corners). The central portion of the ear pad portion 4 is hollow, except for a bottom plate 23 (discussed below), so as to form a path for the sound emitted from the speaker unit 3. A plurality of heat conductive portions 20 that come into contact with the user and transfer heat are provided on the inward-facing side of the ear pad portion 4 that comes into contact with the user's ear.

In this embodiment, as shown in FIG. 4, four heat conductive portions 20 are provided so as to be apart from each other. Hereinafter, when it is necessary to distinguish between the four individual heat conductive portions 20, the four heat conductive portions 20 arranged in a U shape shall be called the first heat conductive portion 20-1, the second heat conductive portion 20-2, the third heat conductive portion 20-3, and the fourth heat conductive portion 20-4, in the order in which they are disposed. In the example in FIG. 4, a plurality of heat conductive portions 20 are provided at positions in contact with the lower half of the ear, but a plurality of heat conductive portions 20 may be provided at positions in contact with the upper half of the ear or in contact with the entire ear.

As shown in FIGS. 5 and 6, the ear pad portion 4 comprises a pad main body 21, a heat sink 22, a bottom plate 23, four temperature change modules 24, and four protective sheets 25. The pad main body 21 is provided in a frame shape and has a sponge or other such cushioning material 26 on the inside. The pad main body 21 comes into contact with the user's ear to soften the contact. The pad main body 21 also functions as a member for accommodating the four temperature change modules 24 and the heat sink 22, and the side facing outward is open.

The heat sink 22 is a heat dissipating member that is disposed on the back side of the four temperature change modules 24, and is made of a metal or another such material having excellent thermal conductivity. The heat sink 22 is formed in a frame shape as is the pad main body 21, and is housed inside the pad main body 21. The bottom plate 23 is screwed to the side of the heat sink 22 that faces outward. A plurality of holes 23a that allow sound to pass through are made in the bottom plate 23. On the side of the heat sink 22 that faces inward, four blocks 22a on which are disposed the four temperature change modules 24 are provided so as to project toward the side that comes into contact with the user. These blocks 22a have a rectangular shape to match the elongated rectangular temperature change modules 24. The temperature change modules 24 are disposed on the top surfaces of the blocks 22a by a method such as adhesive bonding, and the back side of a Peltier element is in contact with the top surface. The heat sink 22, including the blocks 22a, is provided in a cavity, and the side facing outward is open.

Because the blocks 22a on which the temperature change modules 24 are disposed project toward the side that comes into contact with the user, the cushioning material 26 can be disposed on the portions other than the blocks 22a, which affords good cushioning when the headphones are worn.

The temperature change modules 24 can be electrically heated and/or cooled to convey a temperature other than normal temperature to the user. a Peltier element, which is a kind of thermoelectric element, can be used as an example of the temperature change modules 24. Depending on the direction of the direct current, the front or back side of the Peltier element becomes a heat dissipation surface, and the opposite side becomes an endothermic surface. Also, the amount of heating or cooling varies with the value (amplitude) of the direct current.

In this temperature change module 24 featuring a Peltier element, a heat dissipation surface or an endothermic surface is formed on the surface 24a facing inward. During heating, the surface 24a becomes a heat dissipation surface, and the side in contact with the top surface of the blocks 22a, which is the back side, is cooled. On the other hand, the situation is reversed during cooling, with the surface 24a becoming an endothermic surface and the side in contact with the top surface of the blocks 22a, which is the back side, being heated. Because of this contact with the heat sink 22, the temperature drop during heating and the temperature rise during cooling that occur on the back side of the temperature change modules 24 are effectively carried out. These four temperature change modules 24 are connected to a control device 30 (discussed below), and are configured to be independently controllable.

The protective sheet 25 is made of rubber or the like and is affixed to the surface 24a of the temperature change modules 24. The protective sheet 25 functions as a cushioning material (has a cushioning function) between the ear and the temperature change modules 24 disposed on the top surfaces of the hard blocks 22a, and softens the feel upon contact.

The heat sink 22 in which the temperature change modules 24 have been disposed is housed inside from the open side facing the outside of the pad main body 21. After this, the bottom plate 23 is screwed to the open side facing the outside of the pad main body 21. Openings 21a having a rectangular shape matching the shape of the temperature change modules 24 are formed on the inward-facing side of the pad main body 21 at four locations matching up with the four temperature change modules 24. The surface 24a of the four temperature change modules 24 to which the protective sheets 25 have been affixed is exposed (exposed to the outside) from the opening 21a to the inward-facing side of the pad main body 21, and this portion corresponds to the heat conductive portions 20 described above.

Thus providing the opening 21a allows the temperature change modules 24 to be brought into contact with the user's ear via the protective sheets 25. This means that the temperature of the temperature change modules 24 can be transmitted to the user more effectively than when contact is made via cloth or another such covering layer forming the inward-facing side of the pad main body 21.

The temperature change module 24 of the first heat conductive portion 20-1 will hereinafter be referred to as necessary as the first temperature change module 24-1. Similarly, the temperature change modules 24 corresponding to the second heat conductive portion 20-2, the third heat conduction section 20-3, and the fourth heat conductive portion 20-4 shall be referred to as the second temperature change module 24-2, the third temperature change module 24-3 and the fourth temperature change module 24-4.

4. How Heat is Transferred in Ear Pad Portion 4

When direct current in a specific direction is passed through the temperature change modules 24 while the user is wearing the headphones 1, the temperature of the surface 24a rises, the surface 24a becomes a heat dissipation surface, the heat is transmitted to the user's ear via the protective sheets 25, and the user feels warmth. On the back surface of the temperature change modules 24, the temperature drops, and the heat is taken away by the heat sink 22. When direct current is passed through the temperature change module 24 in the opposite direction from that during heating, the temperature of the surface 24a drops, the surface 24a becomes an endothermic surface, and heat is taken away from the user's ear through the protective sheets 25, and the user feels cold. Although the temperature rises on the back surface of the temperature change modules 24, this heat is dissipated by the heat sink 22.

5. Control Device 30

Figure 7:
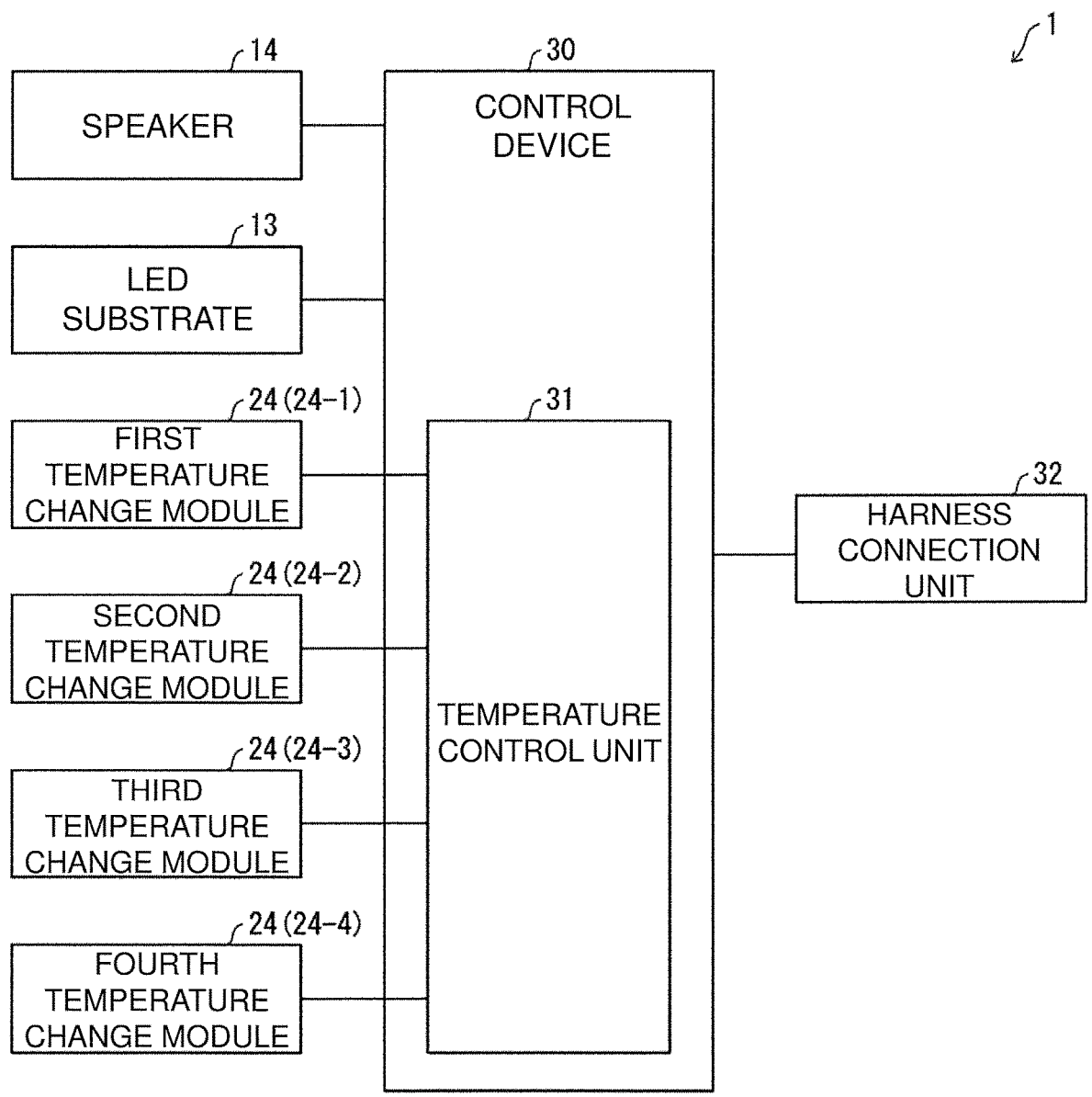
FIG. 7 is a block diagram showing the control system of the headphones.

FIG. 7 is a block diagram of the control system of the headphones 1. As shown in FIG. 7, the headphones 1 comprise a control device 30. The control device 30 consists of a computer device constituted by, for example, a CPU (central processing unit), an arithmetic processing unit such as a dedicated processor, and the like, and controls the operation of the components of the headphones 1.

The speaker 14, the LED substrate 13, the first to fourth temperature change modules 24-1 to 24-4, the harness connection unit 32, and so forth are connected to the control device 30. Although not shown in the drawings, the headphones 1 are connected to an external PC (personal computer) or the like (not shown) via a harness that is connected to the harness connection unit 32. Music data outputted from the speakers 14, display control signals for controlling light display at the light guide plate 12, and temperature control information that controls the temperature of the first to fourth temperature change modules 24-1 to 24-4 are supplied from an external PC or the like to the headphones 1. Also, the power used for operating the components of the headphones 1 is supplied from an external PC or the like via a harness.

The control device 30 functions as a reproduction device for reproducing music and the like, an amplification device for amplifying audio, and so on, generates an audio signal on the basis of the supplied music data, and outputs this audio signal to the speakers 14. Also, the control device 30 outputs the supplied display control signal to the drive circuit 13a of the LED substrate 13.

Furthermore, the control device 30 has a temperature control unit 31. The temperature control unit 31 drives the first to fourth temperature change modules 24-1 to 24-4 on a rotating basis while shifting the phase of operation individually or in groups, on the basis of the supplied temperature control signal. A temperature-variable device for a headphone is configured by the plurality of temperature change modules 24 and the temperature control unit 31 described above. This temperature-variable device may include the heat sink 22, four protective sheets 25, and the like. The drive of the first to fourth temperature change modules 24-1 to 24-4 by the temperature control unit 31 will now be described.

6. Operation of Temperature Change Module 24)

6-1 During Heating

FIG. 8 is an operation diagram showing an example of the operation of the temperature change modules 24 by the control device 30 included in the headphones 1 during heating. As shown in FIG. 8, the temperature control unit 31 of the control device 30 turns on the temperature change modules 24 to raise the temperature change modules 24 to a set temperature (temperature setting during heating). As an example, the temperature setting during heating can be set to about 44 to 50° C., at which humans feel comfortably warm. The temperature of the temperature change modules 24 when OFF is about room temperature. Therefore, the lower is the room temperature and the higher is the set temperature, the higher will be the current value when the modules are ON. The temperature control unit 31 drives the four temperature change modules 24 on a rotating basis while shifting the phase of operation.

In the example in FIG. 8, the four temperature change modules 24 are driven at a specific timing, such as on a rotating basis that is changed every 30 seconds. The point at which a temperature change module 24 that is ON is turned OFF may be the same as the timing at which the next temperature change module 24 is turned ON in the rotation, or may be shifted to be before or after the timing at which the next module is turned ON. In the example in FIG. 8, a temperature change module 24 is turned OFF at the point when the temperature of the next module in the rotation reaches the set temperature. In this case, one of the four temperature change modules 24 will always be at the set temperature.

If the same location is constantly heated, the sensation is dulled and it becomes more difficult to feel the sensation of warmth, but with the headphones 1, the four temperature change modules 24 are driven on a rotating basis to switch the heat conductive portion 20 that exerts an effect. Consequently, it is less likely that the sensation will be dulled, and a temperature change (warmth) can continue to be effectively felt.

Also, even though a temperature may pose any problem in contact for a short period, low-temperature burns may occur if the contact is continued for an extended period. Even at a temperature of about 44 to 50° C., at which humans feel comfortably warm, there is still a risk of low-temperature burns if the contact continues for an extended period. In the headphones 1, since the four temperature change modules 24 are driven on a rotating basis, so that the heat conductive portion 20 that exerts an effect is switched, it is possible to prevent low-temperature burns even if the headphones 1 are used continuously for an extended period of time.

When the temperature change modules 24 are sequentially turned ON on a rotating basis, how long each temperature change module 24 is left ON is 30 seconds in the example in FIG. 8, but the time may be appropriately set by taking into account the set temperature and the like. That is, the time should be set so that the user feels warmth, while still preventing low-temperature burns. From the standpoint of preventing low-temperature burns, it is preferable for this duration to be shorter when the set temperature is high than when it is low.

6-2 During Cooling

FIG. 9 is an operation diagram showing an example of the operation of the temperature change modules 24 by the control device 30 during cooling. As shown in FIG. 9, the control device 30 turns ON the temperature change modules 24 to lower the temperature of the temperature change modules 24 to the set temperature (the set temperature during cooling). As an example, the set temperature during cooling can be set to be about 10 to 15° C. lower than the room temperature at which humans feel comfortably cool. The temperature of the temperature change modules 24 when OFF is about room temperature. Therefore, the higher is the room temperature and the lower is the set temperature, the higher will be the current value when the modules are ON. The control device 30 drives the four temperature change modules 24 on a rotating basis while shifting the phase of operation.

In the example in FIG. 9, the four temperature change modules 24 are driven at a specific timing, such as on a rotating basis that is changed every 30 seconds. The point at which a temperature change module 24 that is ON is turned OFF may be the same as the timing at which the next temperature change module 24 is turned ON in the rotation, or may be shifted to be before or after the timing at which the next module is turned ON. In the example in FIG. 9, a temperature change module 24 is turned OFF at the point when the temperature of the next module in the rotation reaches the set temperature. In this case, one of the four temperature change modules 24 will always be at the set temperature.

If the same location is constantly cooled, the sensation is dulled and it becomes more difficult to feel the sensation of coolness, but with the headphones 1, the four temperature change modules 24 are driven on a rotating basis to switch the heat conductive portion 20 that exerts an effect. Consequently, it is less likely that the sensation will be dulled, and a temperature change (coolness) can continue to be effectively felt.

When the temperature change modules 24 are sequentially turned ON on a rotating basis, how long each temperature change module 24 is left ON is 30 seconds in the example in FIG. 9, but the time may be appropriately set by taking into account the set temperature and the like. That is, the time should be set so that the user feels coolness without a dulling of the sensation.

6-3 When Linked to a Game

FIG. 10 is an operation diagram showing an example of the operation of the temperature change modules 24 by the control device 30 when the temperature change modules 24 are linked with a game. As shown in FIG. 10, the four temperature change modules 24 may be operated as shown in the sections A to F in conjunction with the situation in the game. Here, sections A, C, and E are scenes in which the user is indoors or outdoors at room temperature in the game. Section B is a scene where the user is in an ice world or outdoors in winter in the game. Section D is a scene where the user is in a world of flames, a world where a volcano is erupting, or outdoors in the summer in the game.

When the user enters an ice world or goes outdoors in winter in section B from indoors or a normal-temperature world in section A, the temperature of the temperature change modules 24 is suddenly lowered from room temperature to the set temperature during cooling. Consequently, the world view of the game can be depicted not only in video, but also in temperature, which makes the game feel more immersive.

When the user enters a world of flames or a world in which a volcano is erupting in section D from indoors or a normal-temperature world in section C, the temperature of the temperature change modules 24 is rapidly raised from room temperature to the set temperature during heating. Consequently, the world view of the game can be depicted not only in video, but also in temperature, which makes the game feel more immersive.

In these cases, driving the four temperature change modules 24 on a rotating basis allows the user to continuously feel coolness or warmth, without the sensation becoming dulled. Also, the four temperature change modules 24 may be individually driven on a rotating basis as shown in FIGS. 8 and 9, but if two modules are driven as a pair, the user can be made to feel a sudden temperature drop or rise, which provides an element of surprise.

Section F is a case where the user is near a bonfire in a cold world in the game. The first and second temperature change modules 24-1 and 24-2 located near the front part (face side) of the user are driven at the set temperature during heating, and the third and fourth temperature change modules 24-3 and 24-4 located near the rear part (occipital side) of the user are driven at the set temperature during cooling. That is, the drive of the four temperature change modules 24 is split up into those located near the front part of the user and those located near the rear part of the user. Consequently, in a scene where the temperature is different between the front and the back sides of the user, the world view of the game can be depicted not only in video, but also in temperature, which makes the game feel more immersive.

§ 3 Modification Examples

An embodiment of the present invention was described in detail above, but the above description is merely an example of the present invention in all respects. It should go without saying that various improvements and modifications are possible without departing from the scope of the present invention. For instance, the following modifications can be made. In the following, constituent elements that are the same as in the above embodiment will be numbered the same, and things that are the same as in the above embodiment may not be described again. The following modification examples can be combined as needed.

(1) In the above embodiment, an example was given in which a plurality of heat conductive portions 20 (four as an example) were disposed in a U shape, but these may be disposed in a frame shape to match the shape of the pad main bodies 21, or may be disposed in an inverted U shape.

(2) In the above embodiment, an example was given in which voice data, temperature control signals, electrical power, or the like was supplied via a harness connected to the harness connection unit 32, but a receiver may be installed and voice data or temperature control signals may be received wirelessly, and a battery may be installed.

(3) In the above embodiment, an example was given in which one set temperature during heating and one set temperature during cooling were set, but a plurality of set temperatures may be set for each. Doing this allows the set temperature of an ice world to be lower than the set temperature for outdoors in winter, which makes the game feel more immersive.

(4) In the above embodiment, an example was given in which a plurality of temperature change modules 24 were separately driven, the modules being split up into those located near the front part of the user and those located near the rear part of the user, but the module drive may instead be split up into right and left sides. This affords an even stronger immersive feeling in a scene where a pillar of fire appears on one side of the user's face, or in a scene where the user does battle while avoiding flames emitted from a flame-thrower to the left and right, for example.

(5) In the above embodiment, an example was given in which a plurality of Peltier elements were mounted on a single heat sink 22, but when the modules are split up into those located near the front and rear parts of the user and separately driven, as in section F in FIG. 10, the heat sink 22 may also be divided into front and rear parts. This makes it possible to separate heat dissipation and heat capture in the heat sink. Also, if a heat insulating member is interposed between the divided parts of the heat sink, it is possible to more effectively separate heat dissipation and heat capture in the heat sink.

(6) In this embodiment, an example was given of headphones 1 that did not comprise a microphone, but the present invention is also applicable to headphones equipped with a microphone (called a headset).

(7) In this embodiment, an example was given of headphones 1 comprising an arm, but the present invention is also applicable to headphones having portions that hook over the ears, instead of the arm.

Example of Implementation by Software

The temperature control unit 31 of the control device 30 may be realized by a logic circuit (hardware) formed in an integrated circuit (IC chip) or the like, or may be realized by software. In the latter case, the control device 30 comprises a computer that executes instructions of a program, which is software that realizes various functions. The computer comprises, for example, one or more processors, and also comprises a computer-readable recording medium on which a program is stored. In the computer, the processor reads the program from the recording medium and executes the program, thereby achieving the object of the present invention. A CPU (central processing unit) can be used as the processor, for example. A "non-temporary tangible medium," such as a ROM (read only memory), or a tape, a disk, a card, a semiconductor memory, a programmable logic circuit, or the like can be used as the recording medium. Also, a RAM (random access memory) or the like for expanding the program may be further provided. Also, the program may be supplied to the computer via any transmission medium capable of transmitting the program (communication network, broadcast wave, etc.). One mode of the present invention can also be realized in the form of a data signal embedded in a carrier wave, in which the above-mentioned program is embodied by electronic transmission.

The present invention is not limited to or by the embodiments given above, and various modifications are possible within the scope of the claims. Embodiments obtained by suitably combining the technical means disclosed in different embodiments are also encompassed by the technical scope of the present invention.

The invention claimed is:

1. Headphones, comprising:
a pair of speaker units;
a pair of ear pad portions that cover at least part of user's ears;
a plurality of temperature change units that are provided inside the pair of ear pad portions, the temperature change units configured to heat and/or cool electrically so as to convey a temperature other than normal temperature to a user;
a temperature control unit configured to drive the plurality of temperature change units on a rotating basis while shifting a phase of operation individually or in groups; and
heat sinks that are disposed inside the ear pad portions and on a back surface side of the temperature change units, and have a plurality of blocks that protrude toward a side that comes into contact with the user.

2. The headphones according to claim 1, wherein the temperature change units include a Peltier element.

3. The headphones according to claim 2, wherein back surfaces of the Peltier elements are in contact with a top surfaces of the blocks.

4. The headphones according to claim 1, further comprising
a protective sheet having a cushioning function, on a surface of the temperature change units on a side that makes contact with the user.

5. The headphones according to claim 4, wherein the ear pad portions has an opening that is provided in a surface of each of the pair of ear pad portions on a side that comes into contact with the user, and
the surface of the temperature change unit provided with the protective sheet is exposed to an outside through the opening.

6. The headphones according to claim 1, wherein the temperature control unit drives the plurality of the temperature change units on a rotating basis while shifting the phase of operation individually or in groups, so as to match a content of a game.

7. A temperature-variable device for a headphone that is mounted on headphones, the device comprising:
a plurality of temperature change units that are provided inside a pair of ear pad portions that cover at least a part of user's ears, the temperature change units configured to heat and/or cool electrically so as to convey a temperature other than normal temperature to a user;
a temperature control unit configured to drive the plurality of temperature change units on a rotating basis while shifting a phase of operation individually or in groups; and
heat sinks that are disposed inside the ear pad portions and on a back surface side of the temperature change units, and have a plurality of blocks that protrude toward a side that comes into contact with the user.

* * * * *